(12) United States Patent
Brink et al.

(10) Patent No.: US 8,851,830 B2
(45) Date of Patent: Oct. 7, 2014

(54) HARMONIZATION OF MULTIPLE GEAR TRAIN CONFIGURATIONS

(75) Inventors: Neil Brink, Greenwood, IN (US);
Leonard L. Haas, Clayton, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 976 days.

(21) Appl. No.: 12/901,448

(22) Filed: Oct. 8, 2010

(65) Prior Publication Data
US 2011/0085890 A1   Apr. 14, 2011

Related U.S. Application Data

(60) Provisional application No. 61/249,628, filed on Oct. 8, 2009.

(51) Int. Cl.
*F01D 15/12* (2006.01)
*F16H 57/022* (2012.01)
*F02C 3/10* (2006.01)
*F02C 7/36* (2006.01)
*F16H 35/08* (2006.01)

(52) U.S. Cl.
CPC ........ *F01D 15/12* (2013.01); *F05D 2260/4031* (2013.01); *F16H 57/022* (2013.01); *F02C 3/10* (2013.01); *F16H 2057/0224* (2013.01); *F02C 7/36* (2013.01)
USPC .......... 415/124.1; 416/1; 416/170 R

(58) Field of Classification Search
USPC ........ 415/122.1, 124.1, 124.2; 416/160, 416/170 R; 74/606 R, 396, 397; 123/197.1
See application file for complete search history.

(56) References Cited

U.S. PATENT DOCUMENTS

| | | | |
|---|---|---|---|
| 3,734,073 A | 5/1973 | Walter et al. | |
| 3,783,710 A * | 1/1974 | Steinhagen | 74/665 GA |
| 3,853,432 A * | 12/1974 | Cronstedt | 417/405 |
| 4,020,664 A | 5/1977 | Koizumi et al. | |
| 4,532,822 A | 8/1985 | Godlewski | |
| 4,554,044 A | 11/1985 | Gaspar et al. | |
| 4,725,152 A | 2/1988 | Heinrich et al. | |
| 5,174,169 A | 12/1992 | Allen | |
| 5,352,163 A | 10/1994 | Minegishi et al. | |
| 6,354,976 B1 | 3/2002 | Mills | |
| 6,364,803 B1 | 4/2002 | Barnholt et al. | |
| 6,513,401 B2 * | 2/2003 | Bologna | 74/397 |
| 7,225,697 B2 | 6/2007 | Schalk et al. | |

* cited by examiner

*Primary Examiner* — Edward Look
*Assistant Examiner* — Jason Davis
(74) *Attorney, Agent, or Firm* — Krieg DeVault LLP

(57) ABSTRACT

A gear arrangement is disclosed herein. The gear arrangement includes a housing. The gear arrangement also includes a plurality of gears at least partially disposed in the housing and engaged with respect to one another. The gear arrangement also includes a support post mounted to the housing. The support post supports at least one of the gears. The support post has a first portion extending away from the housing and encircled by one of the gears. The support post also has a pin projecting away from the first portion. The first portion and the pin are eccentric to one another such that the first portion is centered on a first axis and the pin is centered on a second axis. The first and second axes are parallel to and spaced from one another. The gear arrangement also includes a plurality of pin apertures defined by the housing. The plurality of pin apertures are positioned about a circle and each is operable to receive the pin for adjustably positioning the first portion in one of a plurality of different positions.

17 Claims, 5 Drawing Sheets

HARMONIZATION OF MULTIPLE GEAR TRAIN CONFIGURATIONS

CROSS-REFERENCE TO RELATED APPLICATIONS

This application claims the benefit of U.S. Provisional Patent Application Ser. No. 61/249,628 for a HARMONIZATION OF MULTIPLE TURBINE ENGINE CONFIGURATIONS, filed on Oct. 8, 2009, which is hereby incorporated by reference in its entirety.

BACKGROUND OF THE INVENTION

1. Field of the Invention

The invention relates to gear trains, such as those found in turbine engines.

2. Description of Related Prior Art

A turbine engine can be designed and developed based on one or more desired outputs. For example, a turbine engine for aircraft propulsion can be designed and developed to produce a particular amount of thrust. Alternatively, a turbine engine for energy generation can be designed and developed to achieve a particular level of efficiency. Further, a turbine engine can be designed and developed to strike a balance among several desired outputs.

SUMMARY OF THE INVENTION

In summary, the invention is a gear arrangement. The gear arrangement includes a housing. The gear arrangement also includes a plurality of gears at least partially disposed in the housing and engaged with respect to one another. The gear arrangement also includes a support post mounted to the housing. The support post supports at least one of the gears. The support post has a first portion extending away from the housing and encircled by one of the gears. The support post also has a pin projecting away from the first portion. The first portion and the pin are eccentric to one another such that the first portion is centered on a first axis and the pin is centered on a second axis. The first and second axes are parallel to and spaced from one another. The gear arrangement also includes a plurality of pin apertures defined by the housing. The plurality of pin apertures are positioned about a circle and each is operable to receive the pin for adjustably positioning the first portion in one of a plurality of different positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF AN EXEMPLARY EMBODIMENT

The invention, as exemplified in the embodiment described below, can be applied to minimize the number of components that are different between a plurality of different turbine engines. By way of example and not limitation, a plurality of turbine engines can be desired wherein the difference between the turbine engines is output speed. The majority of the turbine engine can deliver an input speed to an output gear box of the turbine engine. The output gear box for each turbine engine can be different to yield different output speeds. The exemplary embodiment described below allows the number of different components among the various output gear boxes for the turbine engines to be minimized.

Figure 1:
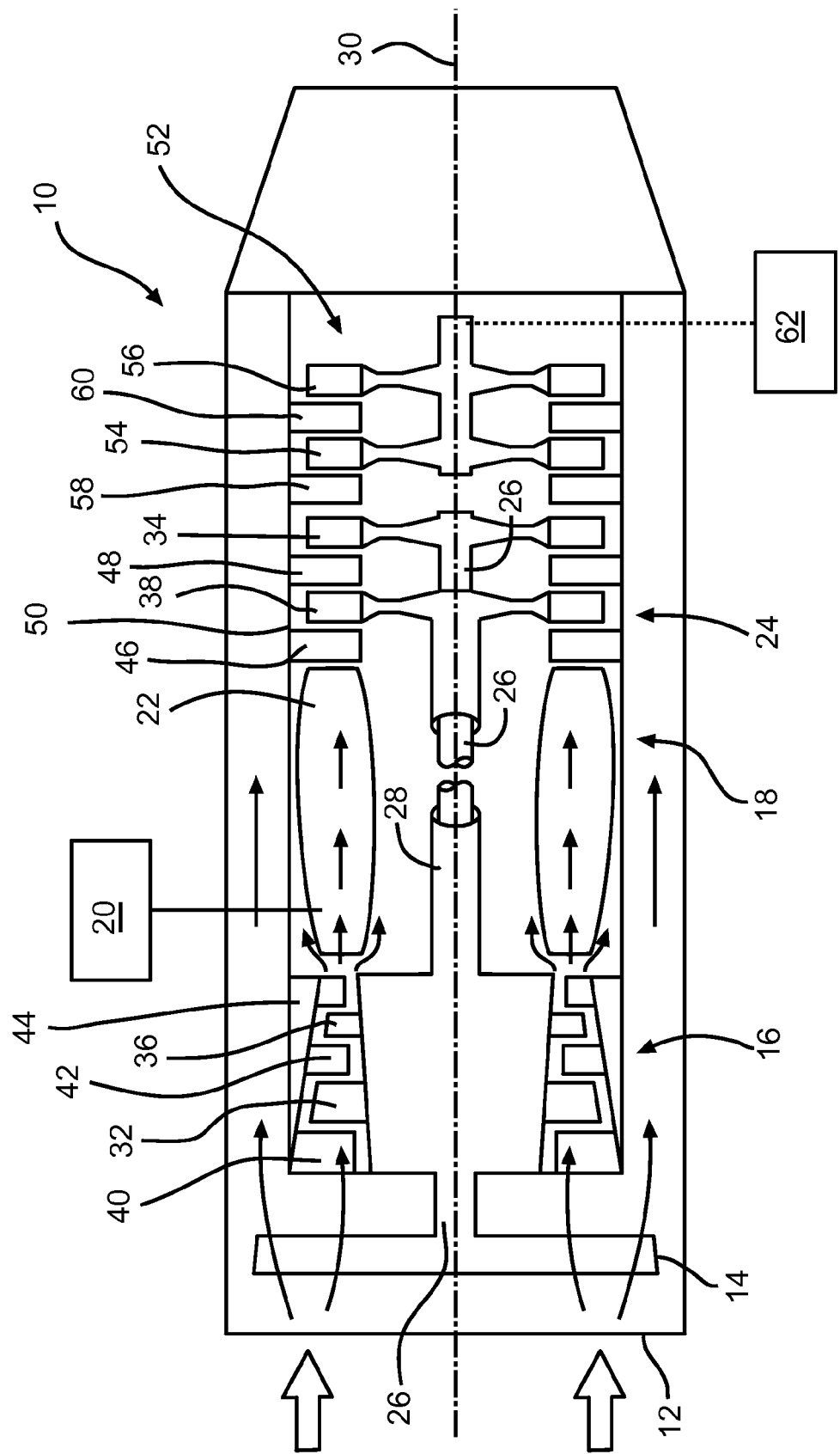
FIG. 1 is a schematic representation of a turbine engine incorporating an exemplary embodiment of the invention.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The exemplary embodiment of the invention can be practiced in any configuration of turbine engine and for any application.

The exemplary turbine engine 10 can include an inlet 12 with a fan 14 to receive fluid such as air. Alternative embodiments of the invention may not include a fan. The turbine engine 10 can also include a compressor section 16 to receive the fluid from the inlet 12 and compress the fluid. The turbine engine 10 can also include a combustor section 18 to receive the compressed fluid from the compressor section 16. The compressed fluid can be mixed with fuel from a fuel system 20 and ignited in a combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about a centerline axis 30 of the turbine engine 10. Alternative embodiments of the invention can include any number of shafts. The shafts 26, 28 can be journaled together for relative rotation. The shaft 26 can be a low pressure shaft supporting compressor blades 32 of a low pressure portion of the compressor section 16. The shaft 26 can also support low pressure turbine blades 34 of a low pressure portion of the turbine section 24.

The shaft 28 encircles the shaft 26. Bearings can be disposed between the shafts 26, 28. The shaft 28 can be a high pressure shaft supporting compressor blades 36 of a high pressure portion of the compressor section 16. The shaft 28 can also support high pressure turbine blades 38 of a high pressure portion of the turbine section 24.

FIG. 1 also shows compressor vanes 40 and 42 mounted upstream of the blades 32 and 36, respectively. The vanes 40, 42 are shown as radially cantilevered to simplify the schematic FIG. 1. The vanes 40, 42 are shown mounted at radially outer ends to a case 44. However, the vanes 40, 42 can be supported at both radial ends by inner and outer cases.

FIG. 1 also shows turbine vanes 46 and 48 mounted upstream of the blades 38 and 34, respectively. The vanes 46, 48 are shown as radially cantilevered to simplify the schematic FIG. 1. The vanes 46, 48 are shown mounted at radially outer ends to a case 50. However, the vanes 46, 48 can be supported at both radial ends by inner and outer cases.

FIG. 1 also shows a free power turbine 52 positioned downstream of the turbine section 24. The free power turbine 52 can receive the combustion gases from the turbine section 24 and convert energy associated with the combustion gases into kinetic energy (motion). The free power turbine 52 can include blades 54, 56. FIG. 1 shows the blades 54, 56 as part of a unitary structure, but the blades 54, 56 can each be part of respective rows of blades that are independently movable.

Vanes 58, 60 for directing the combustion gases to the blades 54, 56 can be mounted upstream of the blades 54 and 56, respectively.

The free power turbine 52 can generate power to be transmitted through an output gear box 62. The power can be transmitted for different applications in different embodiments of the invention. For example, the power can be transmitted for accessories to the turbine engine 10, for powering aircraft propulsion structures such as a turbo-prop or a helicopter transmission, or for powering other devices.

Figure 2:
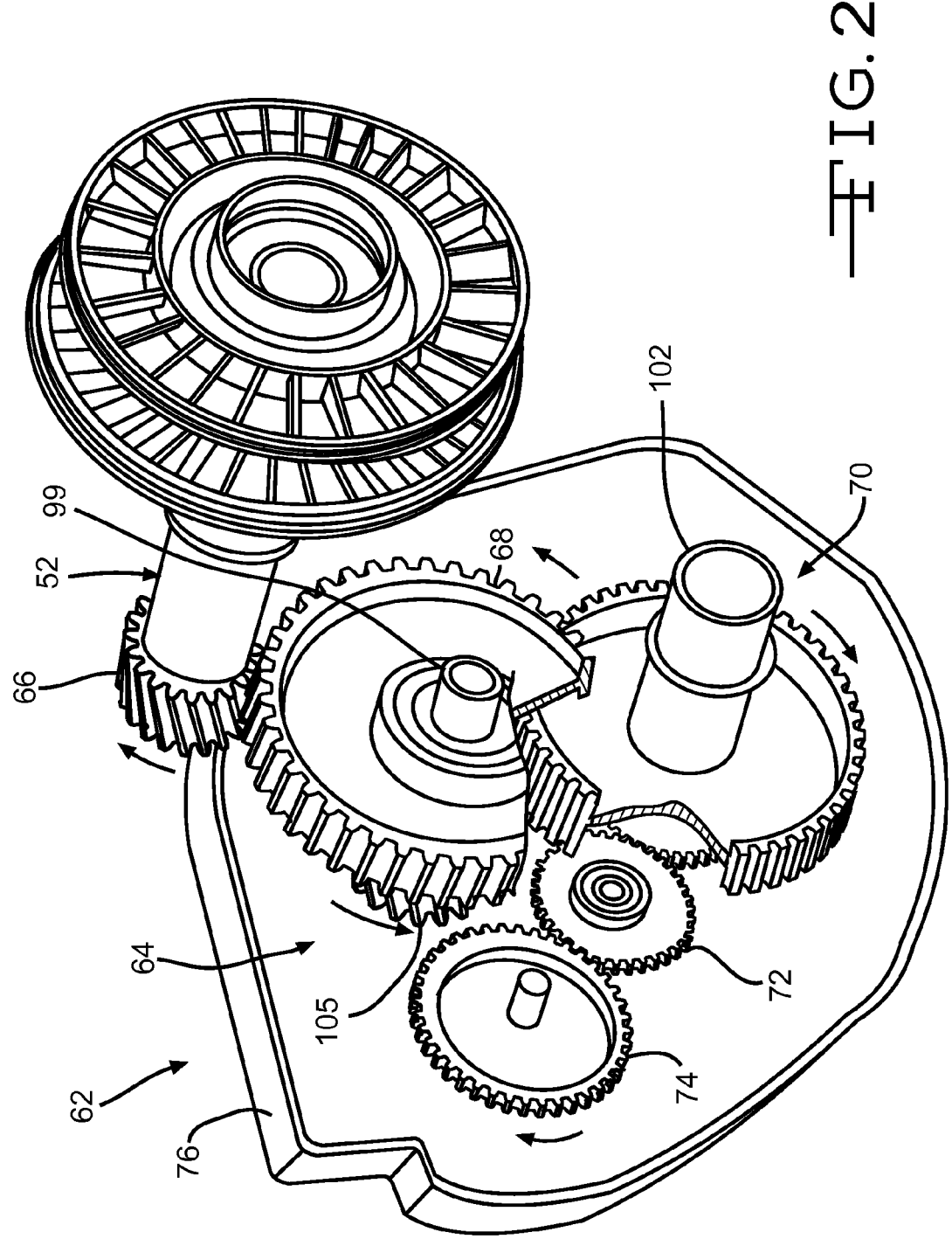
FIG. 2 is an exploded view of a gear train according to the exemplary embodiment of the invention.

FIG. 2 shows an exploded view of an exemplary gear train 64 as part of the exemplary output gear box 62. The free power turbine 52 can include an input gear 66 mating with the gear train 64. The gear 66 can mate with a gear 68 of the gear train 64. The gear 68 can include structure to function as a torque meter and can step down the rotational speed of the gear 66 in the exemplary embodiment. The gear 68 can be mounted on a shaft 99. A gear 105 can also be mounted on the shaft 99. The gear 105 can mate with a gear 70 of the gear train 64. The gear 70 can be an output gear wherein power is transmitted outside the gear box 62 through the gear 70 or a shaft fixed to the gear 70 in the exemplary embodiment.

Figure 3:
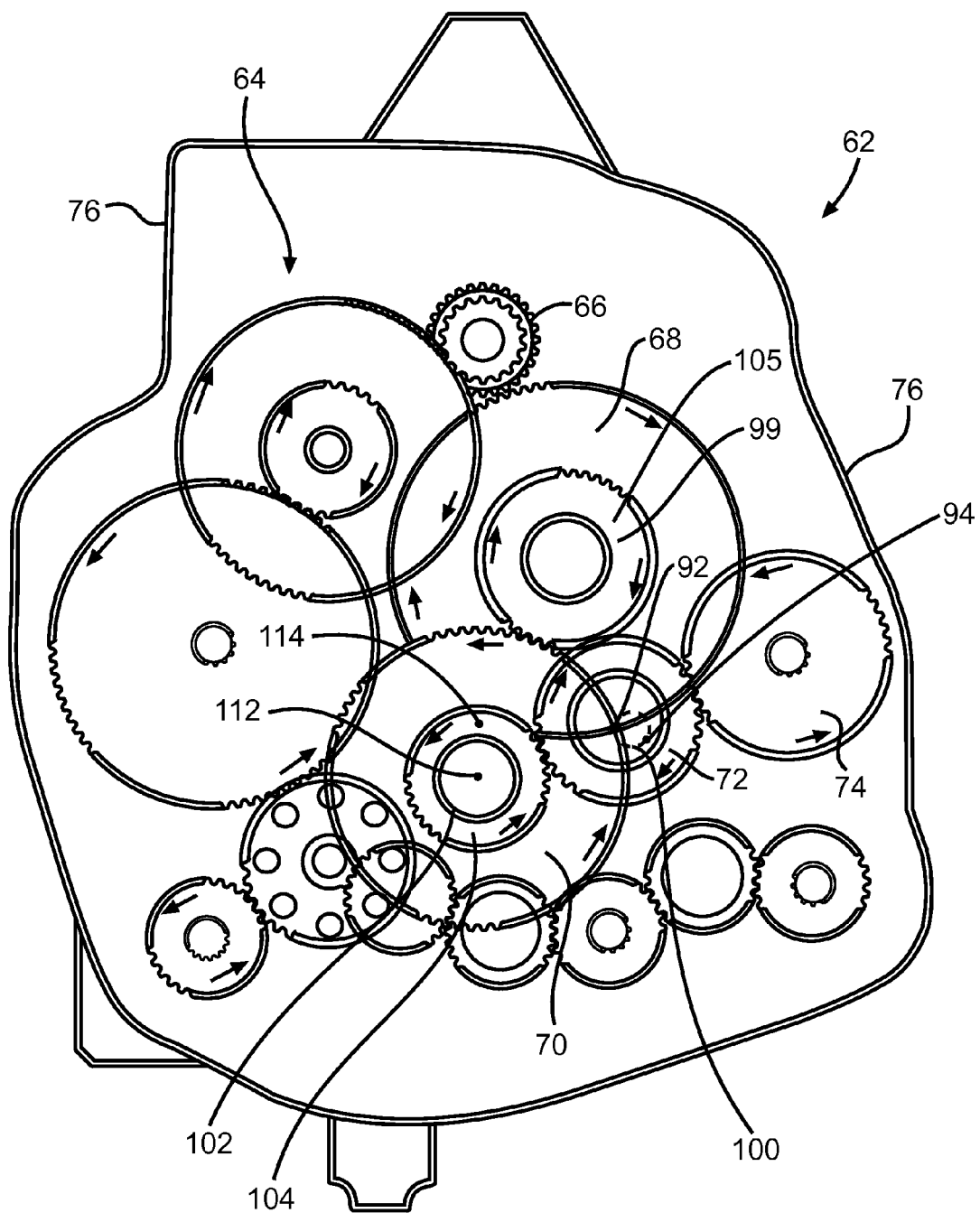
FIG. 3 is a front view of the gear train shown in FIG. 2.

As shown in FIG. 3, the gear 70 can be mounted on a shaft 102. A gear 104 can also be mounted on the shaft 102. The gear 104 can mate with a gear 72 of the gear train 64. The gear 72 can be a power train idler gear to change the speed of rotation from the gear 70 and transmit the changed speed of rotation to another gear. In the exemplary embodiment, the gear 72 can mate with a gear 74 of the gear train 64. The gear 74 can be associated with a governor for the turbine engine. FIG. 3 shows a front view of the exemplary gear box 62. The gears 68, 70, 72, 74 can be engaged with respect to one another such that each gear is meshed with at least one other gear. It is noted that the descriptions of the exemplary gears 68, 70, 72, 74 of the gear train 64 are exemplary and that other embodiments of the invention can include different numbers of gears, different purposes for each gear, different relative sizes of gears, and different types of gears.

It can be desirable that the gear box 62 with gear train 64 be applied in different configurations of turbine engines with minimized changes. For example, it can be desirable that different configurations of turbine engines share common components to minimize the number of part numbers. The exemplary embodiment provides a structure for applying the majority of the same components of the gear box 62 in different configurations of turbine engines.

For example, it may be desirable to use the turbine engine 10 shown in FIG. 1 in two different applications wherein the output speed is to be different. Therefore, the majority of the turbine engine can be the same in the two different applications. An initial point of difference can be in the configuration of the output gear 70. The output gear 70 can have a first size in a first configuration of turbine engine and a second size in a second configuration of turbine engine.

While the output gear 70 may be sized differently in the two exemplary turbine engine configurations, it can be desirable to keep other structures receiving output from the gear box 62 the same. For example, it can be desirable to keep the governor for the turbine engine the same. The governor can receive output through the gear 74 in the exemplary embodiment of the invention. Thus, the connection between the gears 70 and 74 (gears 104 and 72) would require change if the output from the gear box 62 through the gear 70 is to be different between two engine configurations and the output gear box 62 through the gear 74 is to be the same.

It is noted that the speed of gear 70 can change with the application requirements. However it can concurrently be desired to maintain the gear 74, the gear driving the governor, at a generally constant speed. Satisfying these operational desires can require that the sizes of gears 104 and 74 change. Thus, it can be desirable to change the position of the gear 72 in order for the gear 72 to mate with the gear 104 and 74 at a plurality of different positions within a housing 76 of the gear box 62. The housing 76 can be a unitary structure or a plurality of structures fixed together. The housing 76 can fully enclose all of the gears or can partially enclose all the gears in various embodiments of the invention.

Figure 4:
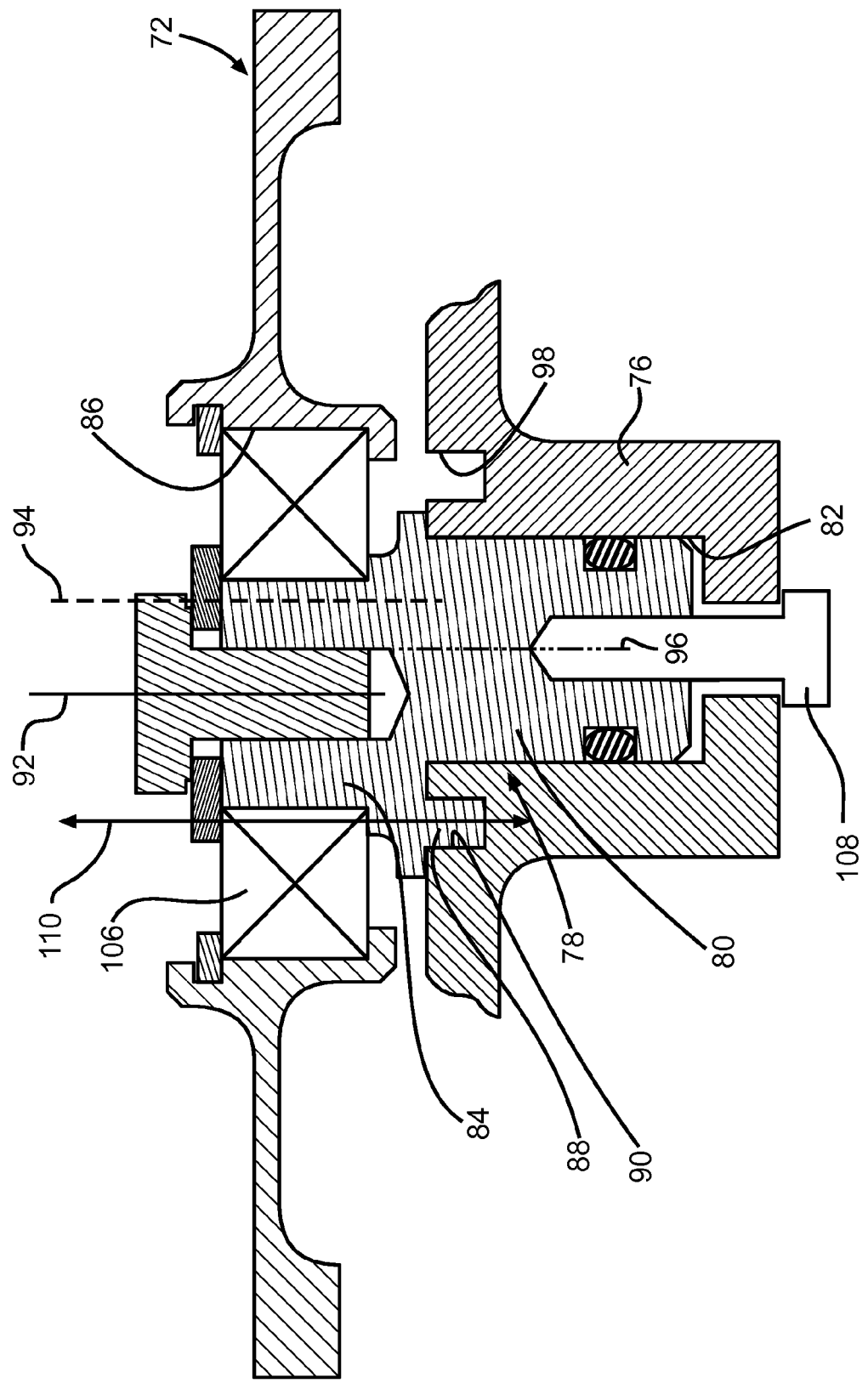
FIG. 4 is a cross-sectional view of the exemplary embodiment.

In the exemplary embodiment, the idler gear 72 can be mounted in a housing 76 of the gear box 62 on an eccentric support post. FIG. 4 shows a cross-section of the exemplary embodiment. The idler gear 72 can be mounted on an eccentric support post 78. The support post 78 can include a second portion 80 received in a post aperture 82 defined by the housing 76. A threaded fastener 108 can extend through a narrowed portion of the post aperture 82 and engage the second portion 80, fixing the support post 78 to the housing 76. The support post 78 can also include a first portion 84 received in an aperture 86 defined by the gear 72. The first portion 84 extends away from the housing 76. A bearing 106 can be positioned between the gear 72 and the first portion to reduce friction and ease rotation of the gear 72. The portions 80 and 84 can be eccentric to one another, centered on parallel and spaced axes 96 and 92 respectively.

The support post 78 can be releasibly fixed to the housing 76 through a pin connection. For example, a pin 88 can extend away from the first portion 84 and be received in an aperture 90 defined by the housing 76. The first portion 84 and the pin 88 are eccentric to one another such that the first portion 84 is centered on the axis 92 and the pin 88 is centered on an axis 110. The axes 92 and 110 are parallel to and spaced from one another. The pin 88 and the second portion 80 can extend parallel to one another. The pin 88, first portion 84, and second portion 80 can be integrally formed and unitary with respect to one another. In the exemplary embodiment, as best shown in FIG. 4, the first portion 84 can be between the pin 88 and the second portion 80 such that the axis 96 is closer to the axis 92 that it is to the axis 110. The engagement between the threaded fastener 108 and the support post 78 urges the pin 88 into the pin aperture 90 and prevents movement of the pin 88 out of the pin aperture 90.

The gear 72 can be supported by the support post 78 to rotate about the axis 92. The gear 72 can rotate about the axis 92 in a first configuration of turbine engine, such as in the embodiment described above. In a second configuration of turbine engine, the gear 72 can rotate about an axis 94. The gear 72 can be moved to rotate about the axis 94 by removing the pin 88 from the aperture 90 and rotating the support post about an axis 96 of the second portion 80. Alternatively, the support post 78 can be initially installed such that the pin 88 is received in an aperture 98 defined by the housing 76.

Figure 5:
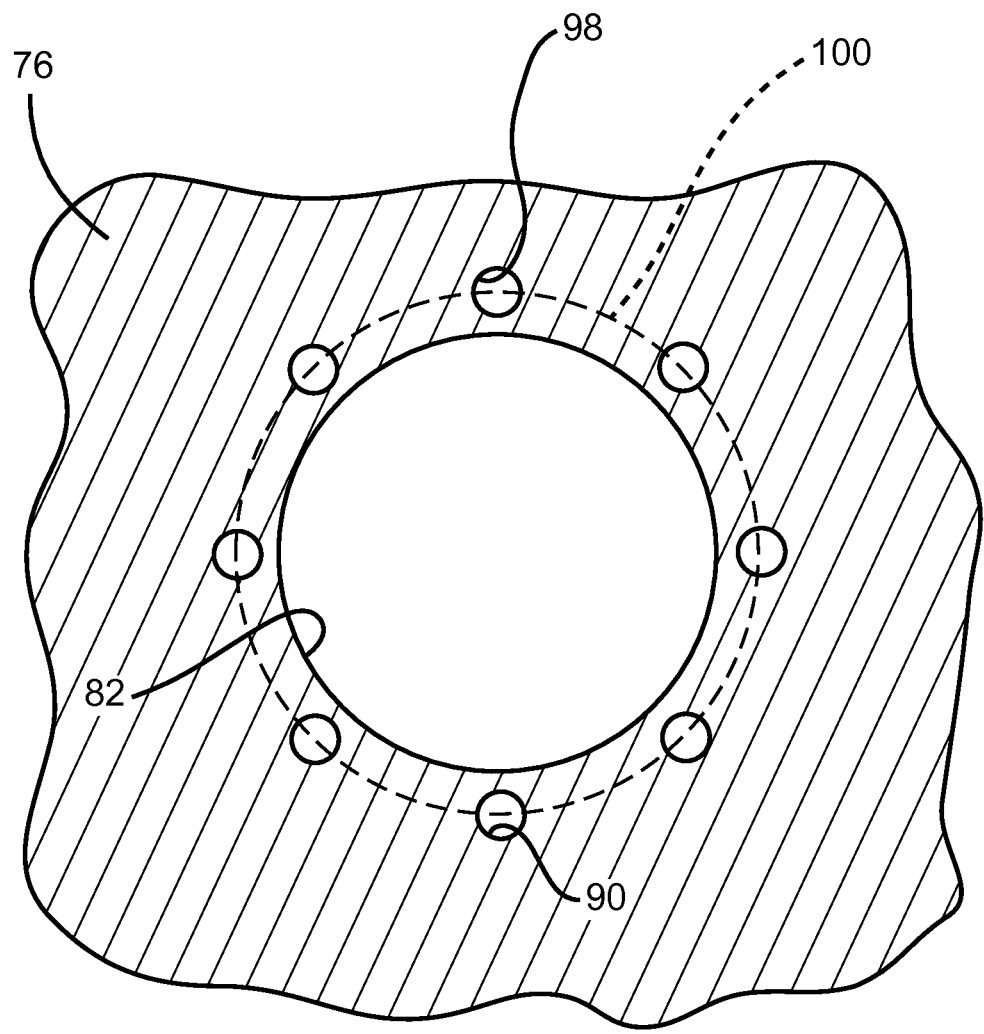
FIG. 5 is a top view of a pin aperture pattern of an exemplary embodiment of the invention.

The exemplary support post 78 thus allows the gear 72 to be positioned in a plurality of positions and to be a common component in a plurality of different turbine engine configurations. FIG. 4 shows that the support post 78 can have at least two different positions in the housing 76. In other embodiments, the support post 78 can be positionable in more than two different positions. FIG. 3 shows a circle 100 in dash line; the center of rotation of the gear 72 can be positionable anywhere along the circle 100. The position of axis 94 is shown along the circle 100. Further, the position of the circle 100 in FIG. 3 is exemplary and the circle 100 could be defined at different locations in other embodiments of the invention. FIG. 5 shows a top-down view of a plurality of pin apertures that could be applied in an embodiment of the invention. The pin apertures can be evenly spaced about the post aperture 82, or could be unevenly spaced from one another in alternative embodiments of the invention. Each of the apertures could receive the pin 88. Each pin aperture thus corresponds to a different position of the support post 78 and the gear 72.

In one example, two different gear trains can be assembled using substantially the same components. A first plurality of gears can be assembled and engaged with respect to one another to form a first gear train. The first gear train can be positioned in a first housing. A second plurality of gears can be assembled and engaged with respect to one another to form a second gear train. The second gear train can be positioned in a second housing. The first and second housings can be identical in an embodiment of the invention. The two gear trains can be identical, with the exception that the gear 70 is differently sized for each of the gear trains. For example, the first gear train can be shown in FIG. 3. The axis of rotation of the gear 70 is referenced at 112. In the second gear train, the gear 70 could be smaller, resulting in a shift of the axis of rotation. The axis of rotation for the gear 70 in the second gear train could be the point referenced at 114. The support post 78 would thus be mounted in differently between the two gear trains. The pin 88 would be received in different pin apertures for the two gear trains. Embodiments of the invention can thus allow maintaining identical groups of gears in different gear trains except for one gear. It is noted that in each gear train, only one of the plurality of pin apertures can be used to receive the pin throughout an operational life of the plurality of gears. In other words, the one or more of the pin apertures might not ever receive the pin in embodiments of the invention. However, the existence of the plurality of pin apertures allows numerous, different versions of gear trains to be produced from a relatively large group of common components.

While the embodiment described above relates to an exemplary situation involving two different configurations of turbine engines, other embodiments can be practiced in which more than two configurations of turbine engines are to be harmonized.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The right to claim elements and/or sub-combinations of the combinations disclosed herein is hereby reserved.

What is claimed is:

1. A gear arrangement comprising:
    a housing;
    a plurality of gears at least partially disposed in said housing and engaged with respect to one another;
    a support post mounted to said housing and supporting at least one of said gears, said support post having a first portion extending away from said housing and encircled by one of said gears and a pin projecting away from said first portion wherein said first portion and said pin are eccentric to one another such that said first portion is centered on a first axis and said pin is centered on a second axis and wherein said first and second axes are parallel to and spaced from one another; and
    a plurality of pin apertures defined by said housing, said plurality of pin apertures positioned about a circle and each operable to receive said pin for adjustably positioning said first portion in one of a plurality of different positions;
    wherein said support post further comprises:
    a second portion projecting away from said first portion parallel to said pin; and wherein said first portion, said second portion, and said pin are integrally formed and unitary with respect to one another.

2. The gear arrangement of claim 1 wherein said first portion and said second portion are eccentric to one another such that said second portion is centered on a third axis and wherein said first and third axes are parallel to and spaced from one another.

3. The gear arrangement of claim 2 wherein said third axis is closer to said first axis than to said second axis.

4. The gear arrangement of claim 1 wherein said housing further comprises:
    a post aperture receiving said second portion.

5. The gear arrangement of claim 4 wherein said plurality of pin apertures encircles said post aperture.

6. The gear arrangement of claim 5 wherein said pin apertures are evenly spaced from one another about said post aperture.

7. The gear arrangement of claim 4 further comprising:
    a fastener extending into said post aperture and engaging said second portion, fixing said support post to said housing.

8. A method of arranging a plurality of gears comprising the steps of:
    at least partially disposing at least one plurality of gears engaged with respect to one another in a housing;
    mounting a support post to the housing operable to support at least one of the gears, the support post having a first portion extending away from the housing and encircled by one of the gears and a pin projecting away from the first portion wherein the first portion and the pin are eccentric to one another such that the first portion is centered on a first axis and the pin is centered on a second axis and wherein the first and second axes are parallel to and spaced from one another; and
    forming a plurality of pin apertures in the housing, the plurality of pin apertures positioned about a circle and each operable to receive the pin for adjustably positioning the first portion in one of a plurality of different positions;
    wherein said support post further comprises:
    a second portion projecting away from said first portion parallel to said pin; and wherein said first portion, said second portion, and said pin are integrally formed and unitary with respect to one another.

9. The method of claim 8 wherein:
    said at least partially disposing step further comprises the steps of:
    at least partially disposing a first plurality of gears engaged with respect to one another in a first housing; and
    at least partially disposing a second plurality of gears engaged with respect to one another in a second housing identical to the first housing, wherein at least one of the second plurality of gears is different from all of the first plurality of gears and a majority of the remaining gears of the second plurality of gear are structurally identical to one of the first plurality of gears; and
    said mounting step further comprises the steps of:

mounting a first support post in the first housing in a first position relative to the at least one of the second plurality of gears; and mounting a second support post in the second housing in a second position different than the corresponding first position in the first housing.

10. The method of claim 9 further comprising the step of: maintaining identical groups of gears in the first and second pluralities of gears except for one gear in each of the first and second pluralities.

11. The method of claim 8 further comprising the step of: fixing the position of the support post with the pin being received in one of the pin apertures and with the second portion of the support post being received in a post aperture of the housing.

12. The method of claim 8 further comprising the step of: arranging the pin apertures to be one of evenly and unevenly spaced from one another about the circle.

13. The method of claim 8 further comprising the step of: using only one of the plurality of pin apertures to receive the pin throughout an operational life of the plurality of gears.

14. A turbine engine comprising:

a free power turbine operably converts energy associated with the combustion gases into kinetic energy;

an input gear fixed for concurrent rotation with said free power turbine;

a housing;

a plurality of gears at least partially disposed in said housing and engaged with respect to one another, said input gear meshed with one of said plurality of gears;

a support post mounted to said housing and supporting at least one of said plurality of gears, said support post having a first portion extending away from said housing and encircled by one of said gears and a pin projecting away from said first portion wherein said first portion and said pin are eccentric to one another such that said first portion is centered on a first axis and said pin is centered on a second axis and wherein said first and second axes are parallel to and spaced from one another; and a plurality of pin apertures defined by said housing, said plurality of pin apertures positioned about a circle and each operable to receive said pin for adjustably positioning said first portion in one of a plurality of different positions;

wherein said support post further comprises a second portion projecting away from said first portion parallel to said pin and received in an aperture formed in said housing; and wherein said first portion, said second portion, and said pin are integrally formed and unitary with respect to one another.

15. The turbine engine of claim 14 wherein all but one of said plurality of pin apertures remain unfilled throughout an operational life of the turbine engine.

16. The turbine engine of claim 14 wherein said support post is fixed to said housing with a threaded fastener.

17. The turbine engine of claim 16 wherein said engagement between said threaded fastener and said support post prevents movement of said pin out of said pin aperture.

* * * * *